(12) United States Patent
Hsieh

(10) Patent No.: US 12,271,081 B2
(45) Date of Patent: Apr. 8, 2025

(54) DISPLAY DEVICE

(71) Applicant: AUO Display Plus Corporation, Hsinchu (TW)

(72) Inventor: Hsin-Yi Hsieh, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 18/640,014

(22) Filed: Apr. 19, 2024

(65) Prior Publication Data
US 2024/0264491 A1 Aug. 8, 2024

(30) Foreign Application Priority Data
Nov. 20, 2023 (TW) .................................. 112144783

(51) Int. Cl.
*G02F 1/1339* (2006.01)
*G02F 1/1333* (2006.01)

(52) U.S. Cl.
CPC ...... *G02F 1/1339* (2013.01); *G02F 1/133311* (2021.01); *G02F 1/133308* (2013.01); *G02F 2202/28* (2013.01)

(58) Field of Classification Search
CPC .......................... G02F 1/1339; G02F 1/133308

USPC ...................................................... 349/58–65
See application file for complete search history.

(56) References Cited

U.S. PATENT DOCUMENTS

| | | | |
|---|---|---|---|
| 2007/0115401 A1* | 5/2007 | Tsubokura | G02F 1/1333 349/58 |
| 2018/0011368 A1* | 1/2018 | Son | G02F 1/133308 |
| 2023/0124477 A1* | 4/2023 | Kim | G02F 1/133531 349/42 |

FOREIGN PATENT DOCUMENTS

| CN | 105866994 A | 8/2016 |
|---|---|---|
| CN | 108761879 A | 11/2018 |

\* cited by examiner

*Primary Examiner* — Charles S Chang

(57) ABSTRACT

A display device includes the following features. A display element is disposed in a frame. A flexible strip is sealed between the display element and the frame and has a first segment and a second segment bent relative to the first segment. The first segment has a first end and a fixed region. The first end is opposite to the second segment. The fixed region is located between the first end and the second segment and fixed to the display element. The second segment is fixed to the frame and has a top and a bottom. The bottom is close to a base portion of the frame, and the top is close to a top portion of the frame. A height between the top and the base portion is larger than or equal to a height between the fixed region and the base portion.

9 Claims, 8 Drawing Sheets

DISPLAY DEVICE

CROSS-REFERENCE TO RELATED APPLICATIONS

This application claims the benefit of Taiwanese Application No. 112144783, filed on Nov. 20, 2023, which is hereby incorporated by reference for all purposes as if fully set forth herein.

FIELD OF THE INVENTION

The present invention relates to a display device.

BACKGROUND OF THE INVENTION

The main assemblies of a liquid crystal display device include a backlight module and a display element. The backlight modules can be further divided into the edge type backlight module and the direct type backlight module based on different ways of light entering. Generally, the edge type backlight module has the advantages of small thickness and low cost. On the other hand, the direct type backlight module provides a better local dimming effect, so that an image has better contrast. The display element may be disposed opposite to the backlight module to transform the light generated by the backlight module to an image display.

Generally, the display element of the liquid crystal display device is configured with a liquid crystal panel and an optical film. On the other hand, the conventional display element is usually provided with a sealing member near the optical film to provide the dust-proof function. The optical film is prone to warping after heated. However, there is not enough space left between the sealing member and the optical film for the optical film to deform in the prior art. Thus, the optical film squeezes the sealing member after warped, which causes force to be partially concentrated on the optical film, thereby leading to a problem such as light leakage.

SUMMARY OF THE INVENTION

The present invention provides a display device, to provide a dust-proof function and enough allowance for the display element to deform.

To achieve one or more of the foregoing objectives, or another objective, the display device provided by the present invention includes a middle frame, a display element, and a flexible sealing strip. The middle frame has a top portion, a base portion, an inner side surface, and an outer side surface. The inner side surface is opposite to the outer side surface. The top portion is opposite to the base portion, and the top portion is located between the inner side surface and the outer side surface. The base portion is connected to the inner side surface. The display element is disposed on the base portion. The flexible sealing strip seals a space between the display element and the inner side surface, and the flexible sealing strip has a first segment and a second segment that are connected to each other. The first segment is bent with respect to the second segment and has a first end and a fixed region. The first end is opposite to a connection side of the first segment connected to the second segment. The fixed region is located between the first end and the connection side, and the fixed region is fixed to the display element. The second segment is fixed to the inner side surface, and the second segment has a top end and a bottom end opposite to the top end. The bottom end is close to the base portion, and the top end is close to the top portion and connected to the connection side of the first segment. A first height is between the top end and the base portion, and a second height is between the fixed region and the base portion. The first height is larger than or equal to the second height.

In an embodiment of the present invention, the display element may include a plurality of optical films. The middle frame further has an opening and an accommodating space. The inner side surface and the base portion surround the accommodating space. The opening penetrates through the top portion, and the opening communicates with the accommodating space. The optical films are stacked in the accommodating space, and one of the optical films closest to the opening is a top optical film. The first segment may further have a non-adhesive region, and the non-adhesive region is located between the fixed region and the connection side. The top optical film has a surface facing toward the opening. The fixed region is fixed to the surface, and the non-adhesive region extends onto the surface.

In an embodiment of the present invention, the display device further includes, for example, an adhesive layer. The adhesive layer is disposed in the fixed region, and the adhesive layer does not extend to the non-adhesive region. The fixed region is connected to the surface via the adhesive layer. The top optical film further has a side surface connected to the surface, and the side surface faces toward the second segment. An orthographic projection of the first end on the surface is a boundary, and the surface has a first width between the boundary and the side surface. The adhesive layer has a first side and a second side. The first side is opposite to the second side, and the second side faces toward the second segment. A second width is between the first side and the second side. The second width is, for example, smaller than or equal to the first width.

In an embodiment of the present invention, the first side does not extend to, for example, the first end, or the first side may be flush with the first end.

In an embodiment of the present invention, the display device may further include a front frame. The front frame is disposed at the top portion, and the front frame shields the flexible sealing strip from the top portion. The first segment is opposite to the front frame, and the first segment is apart from the front frame.

In an embodiment of the present invention, the front frame may overlap with the first end.

In an embodiment of the present invention, the flexible sealing strip further has, for example, a third segment. The second segment is connected to the first segment and the third segment, and the third segment extends between the base portion and the display element. The display element is disposed on the third segment, and the display element is adapted to be moved with respect to the third segment.

In an embodiment of the present invention, the third segment may be fixed to the base portion.

In an embodiment of the present invention, the display device may further include a support member. The support member is located between the base portion and the display element. The third segment extends between the support member and the display element, and the third segment is fixed to, for example, the support member.

In an embodiment of the present invention, the inner side surface may have a first corner, a first surface and a second surface, and the first corner is connected to the first surface and the second surface. The display element has, for example, a second corner corresponding to the first corner. The flexible sealing strip includes a first part and a second part. The first part is sealed between the display element and the first surface, and the second part is sealed between the display element and the second surface. The first part and the second part extend to the first corner and the second corner, and the first part and the second part may overlap with each other at the first corner and the second corner.

The display device of the present invention uses the flexible sealing strip to seal a space between the display element and the middle frame, wherein the first segment of the flexible sealing strip is fixed to the display element, and the second segment is fixed to the middle frame. The second height by which the second segment is distanced from the base portion is larger than or equal to the first height by which the first segment is distanced from the base portion, so that the first segment is maintained in a loose state before squeezed by the display element. Therefore, when the display element starts to deform and push the flexible sealing strip, the first segment can receive an external force applied by the display element, and shows a larger deformation magnitude than the display element as the external force increases, so as to immediately absorb the pushing force of the display element, thus allowing for continuous deformation of the display element without limitation. Based on the foregoing description, the display device of the present invention can not only provide the dust-proof function, but also provide an enough allowance for the display element to deform, thereby improving the optical grade.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
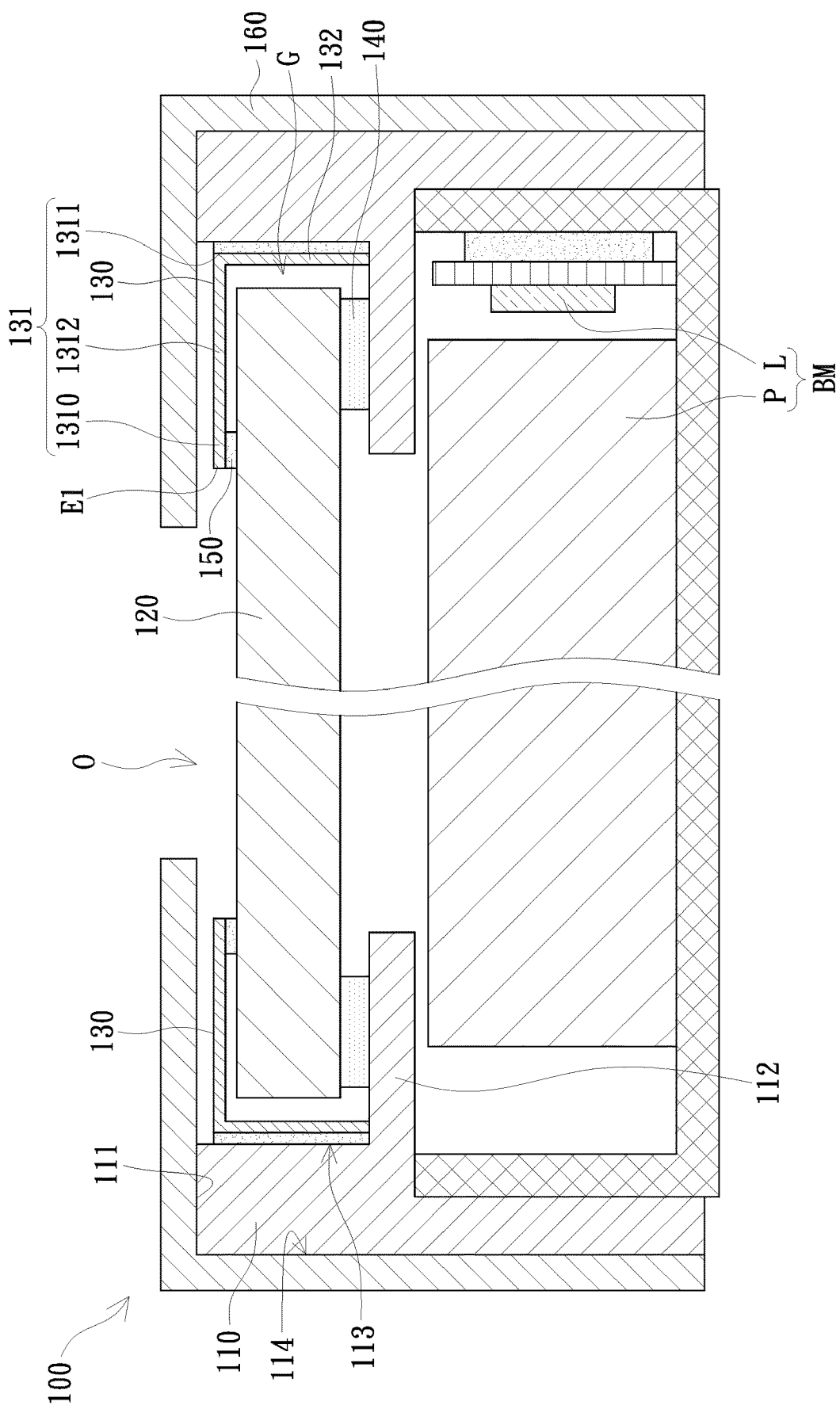
FIG. 1 is a partial schematic cross-sectional view of a display device according to an embodiment of the present invention.
Figure 2:
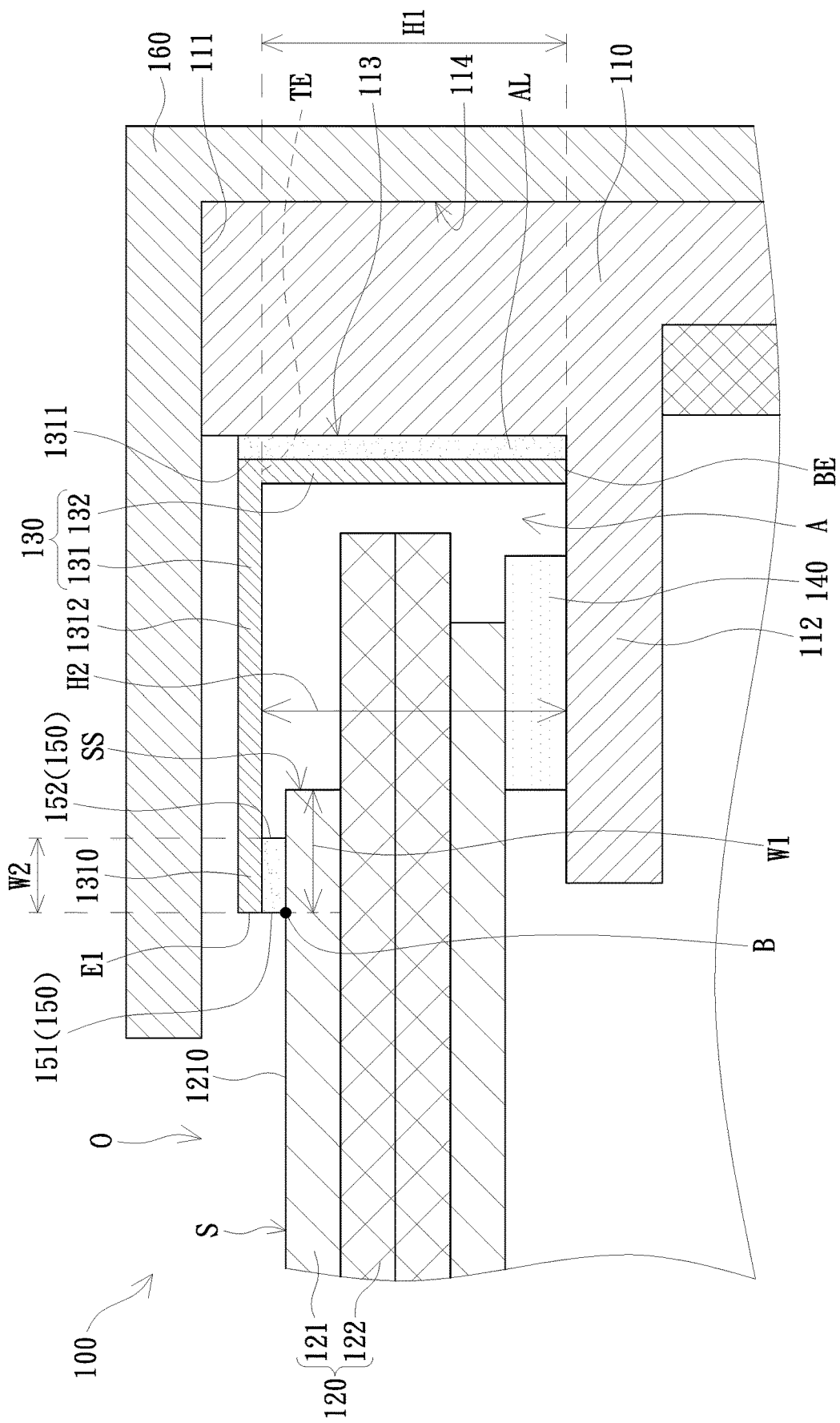
FIG. 2 is a partial schematic enlarged view in FIG. 1.

FIG. 1 is a partial schematic cross-sectional view of a display device according to an embodiment of the present invention. FIG. 2 is a partial schematic enlarged view in FIG. 1. Referring to FIGS. 1 and 2, a display device 100 includes a middle frame 110, a display element 120, and a flexible sealing strip 130. The middle frame 110 includes a top portion 111, a base portion 112, an inner side surface 113, and an outer side surface 114. The inner side surface 113 is opposite to the outer side surface 114. The top portion 111 is opposite to the base portion 112, and the top portion 111 is located between the inner side surface 113 and the outer side surface 114. The base portion 112 is connected to the inner side surface 113. The display element 120 is disposed on the base portion 112. The flexible sealing strip 130 is sealed between the display element 120 and the inner side surface 113. For example, the flexible sealing strip 130 may cover and seal a gap G (shown in FIG. 1) between the display element 120 and the inner side surface 113. The flexible sealing strip 130 has a first segment 131 and a second segment 132 connected to the first segment 131. The first segment 131 is bent with respect to the second segment 132, and the first segment 131 has a first end E1 and a fixed region 1310. The first end E1 is opposite to a connection side 1311 of the first segment 131 connected to the second segment 132. The fixed region 1310 is located between the first end E1 and the connection side 1311, and the fixed region 1310 is fixed to the display element 120. The second segment 132 is fixed to the inner side surface 113, and the second segment 132 has a top end TE and a bottom end BE opposite to the top end TE. The bottom end BE is close to the base portion 112, and the top end TE is close to the top portion 111 and is connected to the connection side 1311 of the first segment 131. A first height H1 is between the top end TE and the base portion 112, and a second height H2 is between the fixed region 1310 and the base portion 112. The first height H1 is larger than or equal to the second height H2, and the first height H1 being equal to the second height H2 is used as an example in this embodiment.

The middle frame 110 may accommodate the display element 120. Specifically, the middle frame 110 further has an opening O and an accommodating space A (shown in FIG. 2). The inner side surface 113 and the base portion 112 surround the accommodating space A. The opening O penetrates through the top portion 111 and communicates with the accommodating space A. The display element 120 may be disposed in the accommodating space A. Further, the display device 100 may further include a front frame 160. The front frame 160 is disposed at the top portion 111, and the display element 120 may be disposed between the base portion 112 and the front frame 160. For example, the display device 100 may further include a support member 140, and the support member 140 is located between the base portion 112 and the display element 120. In this embodiment, the support member 140 may be fixed to the base portion 112, and the display element 120 may be placed on the support member 140. The display element 120 can be heightened from the base portion 112 by the support member 140, so that the display element 120 is closer to the front frame 160. However, the display device 100 may be provided without the support member 140 in one embodiment, and the display element 120 may be disposed on the base portion 112. Incidentally, the middle frame 110 in this embodiment may further accommodate a light guide plate P and a light-emitting element L (both shown in FIG. 1), and the light guide plate P and the light-emitting element L construct a backlight module BM. The backlight module BM may be disposed on a side of the base portion 112 facing away from the display element 120. Further, the backlight module BM may be, for example, an edge type backlight module, but the backlight module BM may be a direct type backlight module in an embodiment, which is not limited in the present invention.

The display element 120 may include a plurality of optical films 121 and a display panel 122, and the optical films 121 and the display panel 122 are stacked in the accommodating space A. The type of the optical film 121 may be determined based on a different type of a display device. For example, the display device 100 may include a liquid crystal display device in this embodiment; the display panel 122 may include a liquid crystal panel, and the optical films 121 may include two polarizers. Specifically, the liquid crystal panel may be sandwiched between the two polarizers. However, the display device 100 is not limited to the foregoing liquid crystal display device in another embodiment, and the optical films 121 and the display panel 122 are not limited to the foregoing polarizer and the liquid crystal panel either.

Figure 3:
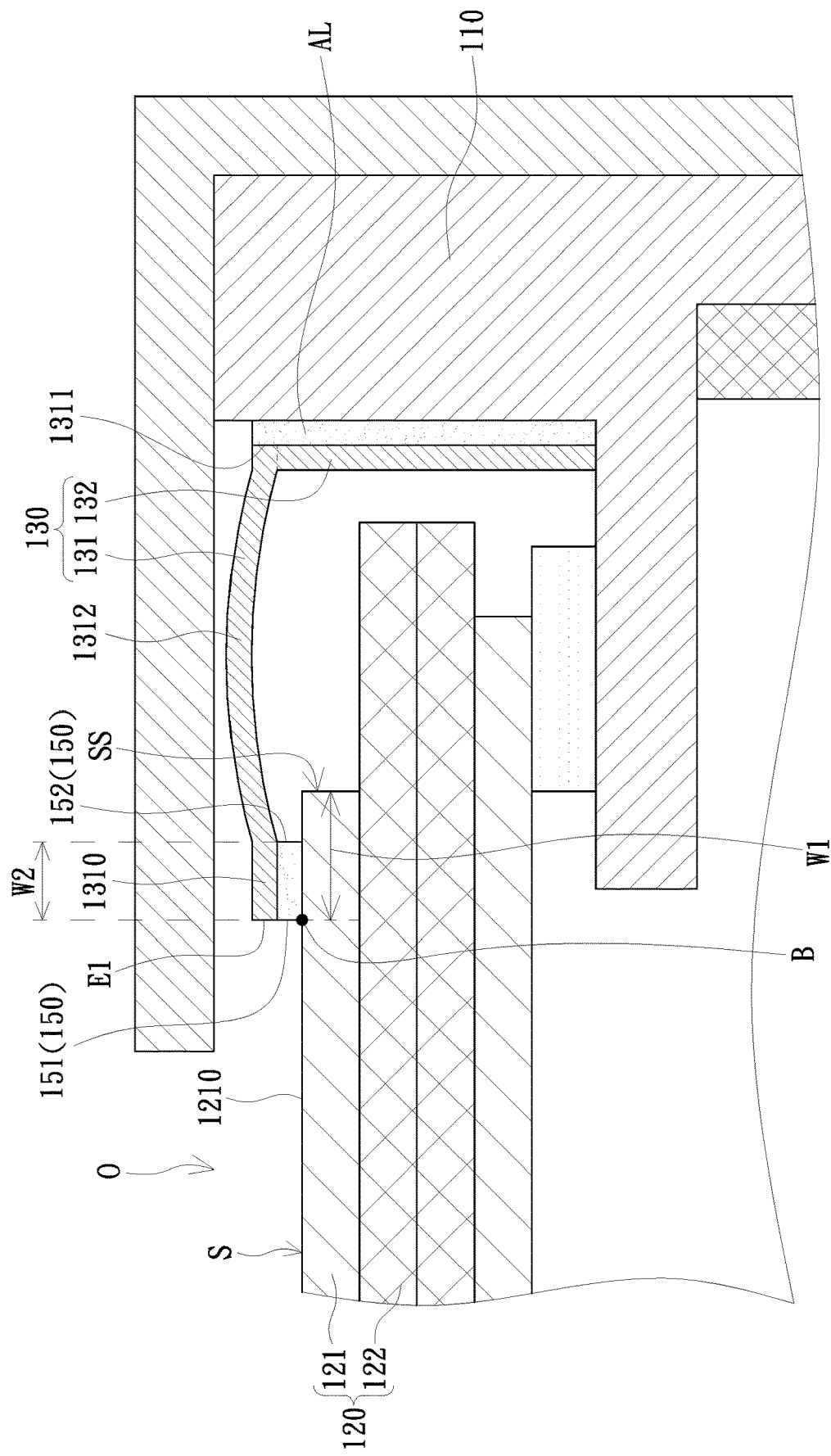
FIG. 3 is a schematic cross-sectional view of a display element squeezing a flexible sealing strip in FIG. 2.

FIG. 3 is a schematic cross-sectional view of a display element squeezing a flexible sealing strip in FIG. 2. Referring to FIGS. 2 and 3, the display element 120 is prone to warping after heated in this embodiment, thereby squeezing the flexible sealing strip 130. Therefore, when the flexible sealing strip 130 is squeezed by the display element 120, the flexible sealing strip 130 can deform immediately to absorb the warping force generated by the display element 120 due to being heated. In this way, when the display element 120 is warped, the flexible sealing strip 130 can still provide a sufficient space, thereby preventing light leakage caused by the display element 120 squeezing other assembly due to warping. A material of the flexible sealing strip 130 may include polyethylene terephthalate (PET), but the present invention is not limited thereto.

One of the optical films 121 closest to the opening O is a top optical film 1210 in this embodiment. The first segment 131 may further have a non-adhesive region 1312, and the non-adhesive region 1312 is located between the fixed region 1310 and the connection side 1311. The top optical film 1210 has a surface S facing toward the opening O. The fixed region 1310 is fixed to the surface S, and the non-adhesive region 1312 extends onto the surface S. Specifically, because the fixed region 1310 is fixed to the top optical film 1210, when the display element 120 is warped to squeeze the flexible sealing strip 130, the fixed region 1310 is not deformed due to being squeezed by the display element 120. On the contrary, because the non-adhesive region 1312 cannot be fixed to the surface S, the non-adhesive region 1312 can be apart from the surface S, thereby being deformed due to being squeezed by the display element 120. Further, because the top optical film 1210 is the element closest to the front frame 160 (or the opening O) in the display element 120, the surface S of the top optical film 1210 can provide a larger area to fix the first segment 131. For example, the fixed region 1310 may be fixed in any area in which the surface S overlaps with the front frame 160, so that the fixed region 1310 can be fixed to a position on the surface S farther away from the connection side 1311. In this way, a length of the non-adhesive region 1312 can be further increased, so that the first segment 131 can absorb more warping force generated by the display element 120, thereby further increasing the deformation allowance of the display element 120. Incidentally, the top optical film 1210 includes, for example, the foregoing polarizer, which, but, is not limited in the present invention.

Figure 4:
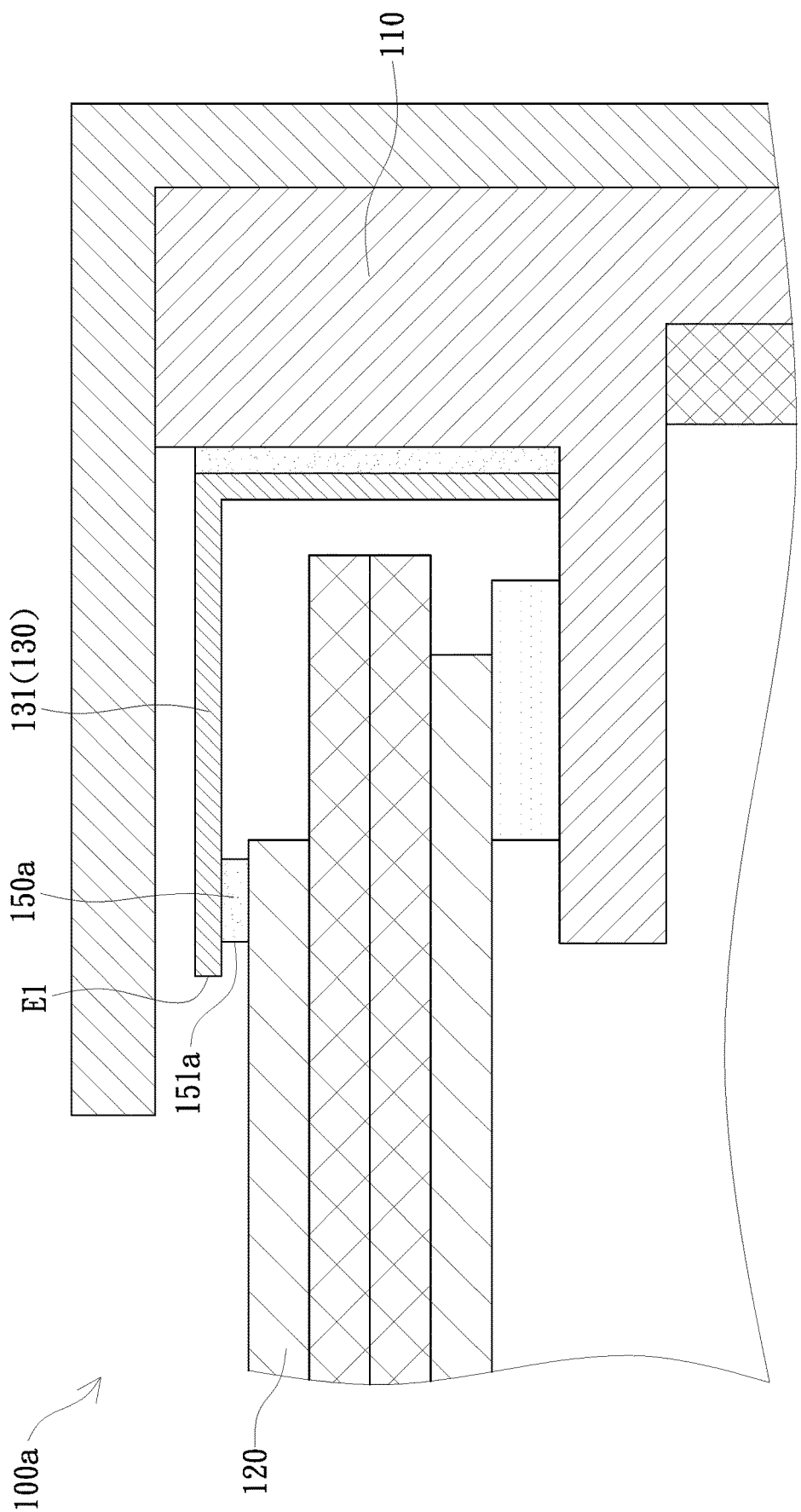
FIG. 4 is a schematic cross-sectional view of a display device according to another embodiment of the present invention.

The display device 100 in this embodiment further includes, for example, an adhesive layer 150 (also shown in FIG. 1). The adhesive layer 150 is disposed in the fixed region 1310, and the adhesive layer 150 does not extend to the non-adhesive region 1312. The fixed region 1310 is connected to the surface S via the adhesive layer 150. The top optical film 1210 further has a side surface SS connected to the surface S, and the side surface SS faces toward the second segment 132. An orthographic projection of the first end E1 on the surface S is a boundary B, and the surface S has a first width W1 between the boundary B and the side surface SS. The adhesive layer 150 has a first side 151 and a second side 152. The first side 151 is opposite to the second side 152, and the second side 152 faces toward the second segment 132. A second width W2 is between the first side 151 and the second side 152. The second width W2 is, for example, smaller than or equal to the first width W1, and the second width W2 being smaller than the first width W1 is used as an example in this embodiment. In other words, the fixed region 1310 of the first segment 131 may be fixed to the surface S via the adhesive layer 150, and the non-adhesive region 1312 of the first segment 131 is apart from the surface S. In this way, the deformable extent of the first segment 131 can be further increased, thereby providing more allowance for the display element 120 to deform. The first side 151 may be flush with the first end E1 in this embodiment, so that the first segment 131 can shield the adhesive layer 150. In another embodiment, such as the display device 100a shown in FIG. 4, the first side 151a does not, for example, extend to the first end E1, so that the first segment 131 can more effectively shield the adhesive layer 150a. Referring to FIG. 2 again, the second segment 132 may be fixed to the inner side surface 113 via another adhesive layer AL in this embodiment. Further, the adhesive layer AL may extend from the top end TE to the bottom end BE, which, however, is not limited by the present invention.

Referring to FIGS. 1 and 2 again, the front frame 160 in this embodiment may shield the flexible sealing strip 130 from the top portion 111. The first segment 131 is opposite to the front frame 160 and apart from the front frame 160, so as to provide a deformation space needed by the first segment 131. In addition, the front frame 160 can further prevent the flexible sealing strip 130 from being exposed from the opening O. For example, the front frame 160 may overlap with the first end E1 to shield the flexible sealing strip 130. Specifically, the front frame 160 may overlap with the first end E1 in the normal direction of the surface S, which is not limited by the present invention.

Figure 5:
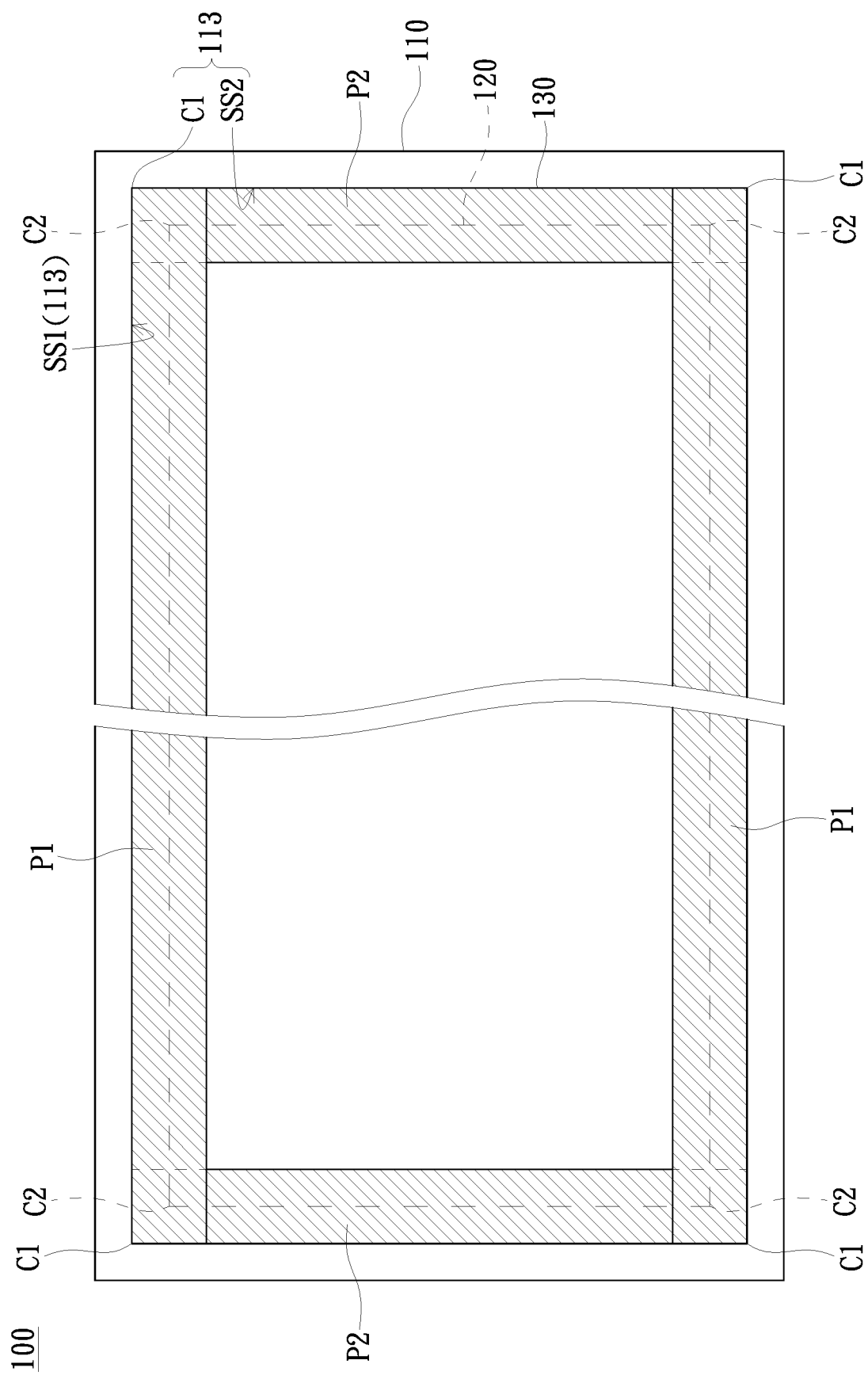
FIG. 5 is a partial schematic top view of the display device in FIG. 1.

FIG. 5 is a partial schematic top view of the display device in FIG. 1. It should be noted that the front frame 160 in FIG. 1 is omitted in FIG. 5, so as to present the structure of the display device 100 more clearly. Referring to FIG. 5, the inner side surface 113 may have a first corner C1, a first surface SS1 and a second surface SS2 in this embodiment, and the first corner C1 is connected to the first surface SS1 and the second surface SS2. The display element 120 has, for example, a second corner C2 corresponding to the first corner C1. The flexible sealing strip 130 includes a first part P1 and a second part P2. The first part P1 is sealed between the display element 120 and the first surface SS1, and the second part P2 is sealed between the display element 120 and the second surface SS2. The first part P1 and the second part P2 extend to the first corner C1 and the second corner C2, and the first part P1 and the second part P2 may overlap with each other at the first corner C1 and the second corner C2, to further improve the tightness between the middle frame 110 and the display element 120. For example, the inner side surface 113 may have four first corners C1, and the display element 120 may have four second corners C2, wherein the first part P1 and the second part P2 may overlap with each other at each first corner C1 and each second corner C2.

As compared with the prior art, the display device 100 in this embodiment uses the flexible sealing strip 130 to seal the space between the display element 120 and the middle frame 110. The first segment 131 of the flexible sealing strip 130 is fixed to the display element 120, and the second segment 132 is fixed to the middle frame 110. The second height H2 by which the second segment 132 is distanced from the base portion 112 is larger than or equal to the first height H1 by which the first segment 131 is distanced from the base portion 112, so that the first segment 131 is maintained in a loose state before squeezed by the display element 120 (referring to FIGS. 2 and 3). Therefore, when the display element 120 starts to deform and push the flexible sealing strip 130, the first segment 131 can receive the external force applied by the display element 120, and shows a larger deformation magnitude than the display element 120 as the external force increases, so as to immediately absorb the pushing force of the display element 120, thereby allowing for continuous deformation of the display element 120 without limitation. Based on the foregoing description, the display device 100 in this embodiment can not only provide the dust-proof function, but also provide an enough allowance for the display element 120 to deform, thereby improving the optical grade.

Figure 6:
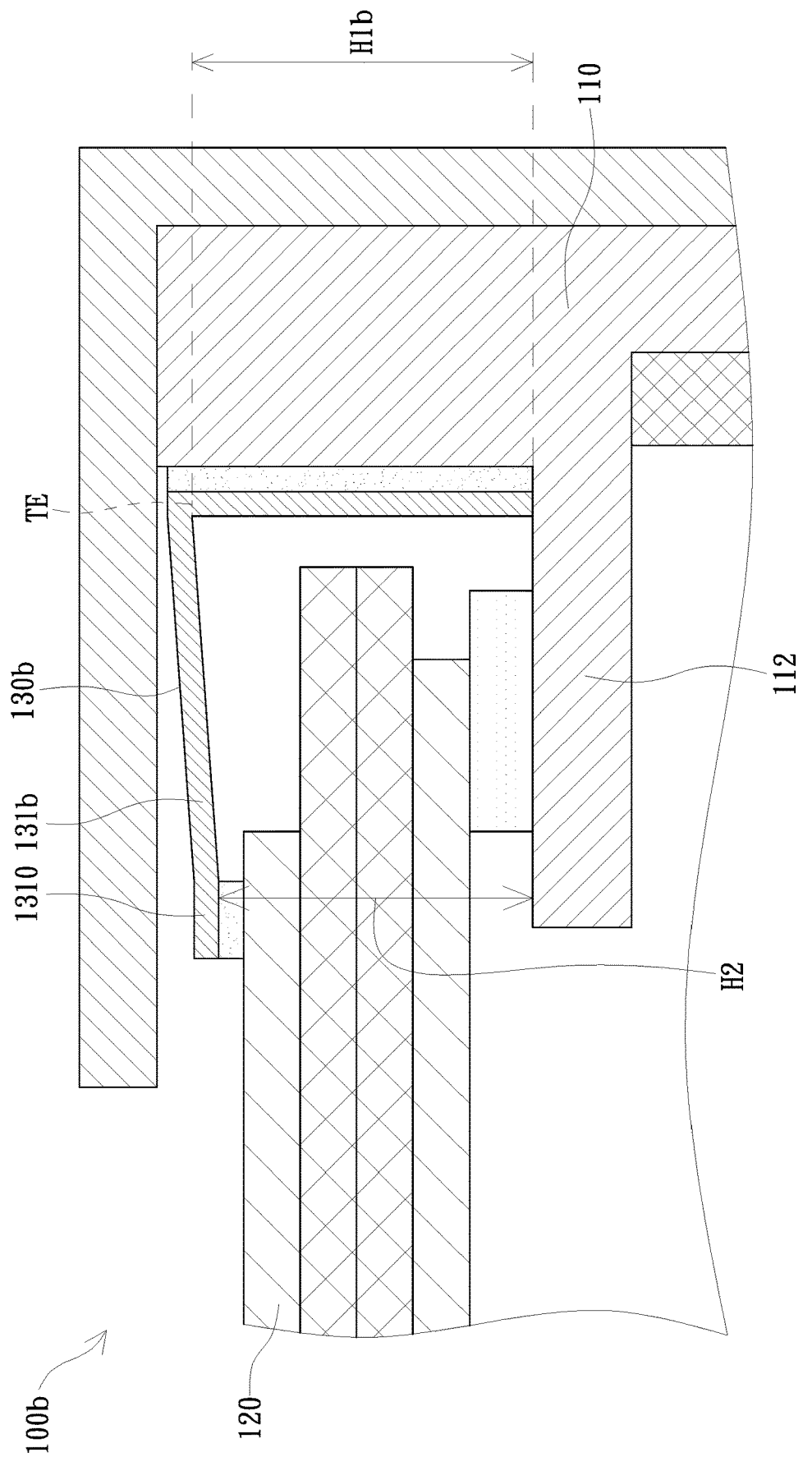
FIG. 6 is a partial schematic cross-sectional view of a display device according to another embodiment of the present invention.

FIG. 6 is a partial schematic cross-sectional view of a display device according to another embodiment of the present invention. The structure and the advantages of the display device 100 in this embodiment are similar to those in the embodiment in FIG. 1, and the following describes only the difference. Referring to FIG. 6, the first height H1$b$ between the top end TE and the base portion 112 may be larger than the second height H2 between the fixed region 1310 and the base portion 112. In this way, the length of the first segment 131$b$ can be further increased, so that the deformable extent of the first segment 131$b$ of the flexible sealing strip 130 can be larger, thereby providing more allowance for the display element 120 to deform.

Figure 7:
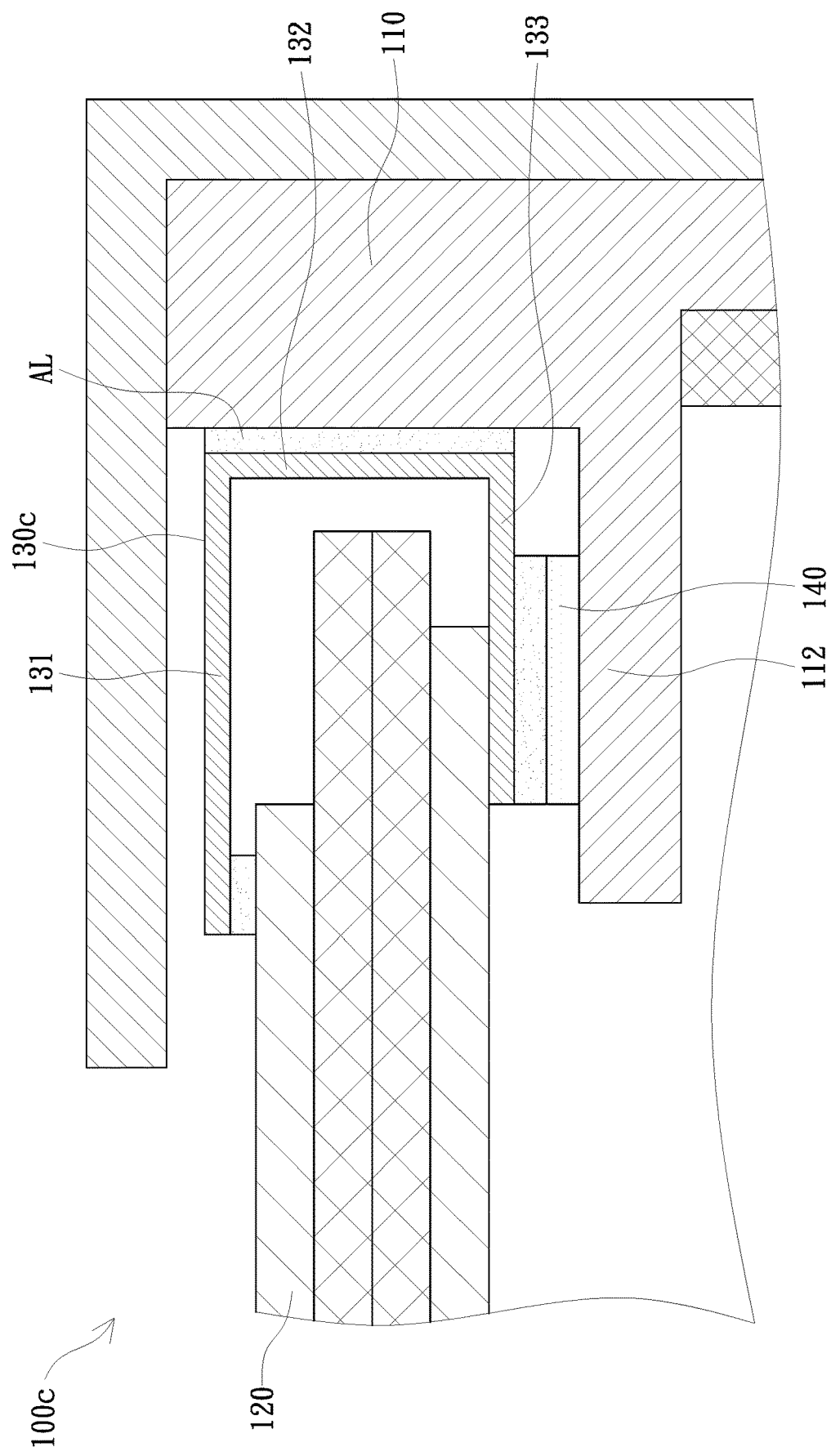
FIG. 7 is a partial schematic cross-sectional view of a display device according to another embodiment of the present invention.
Figure 8:
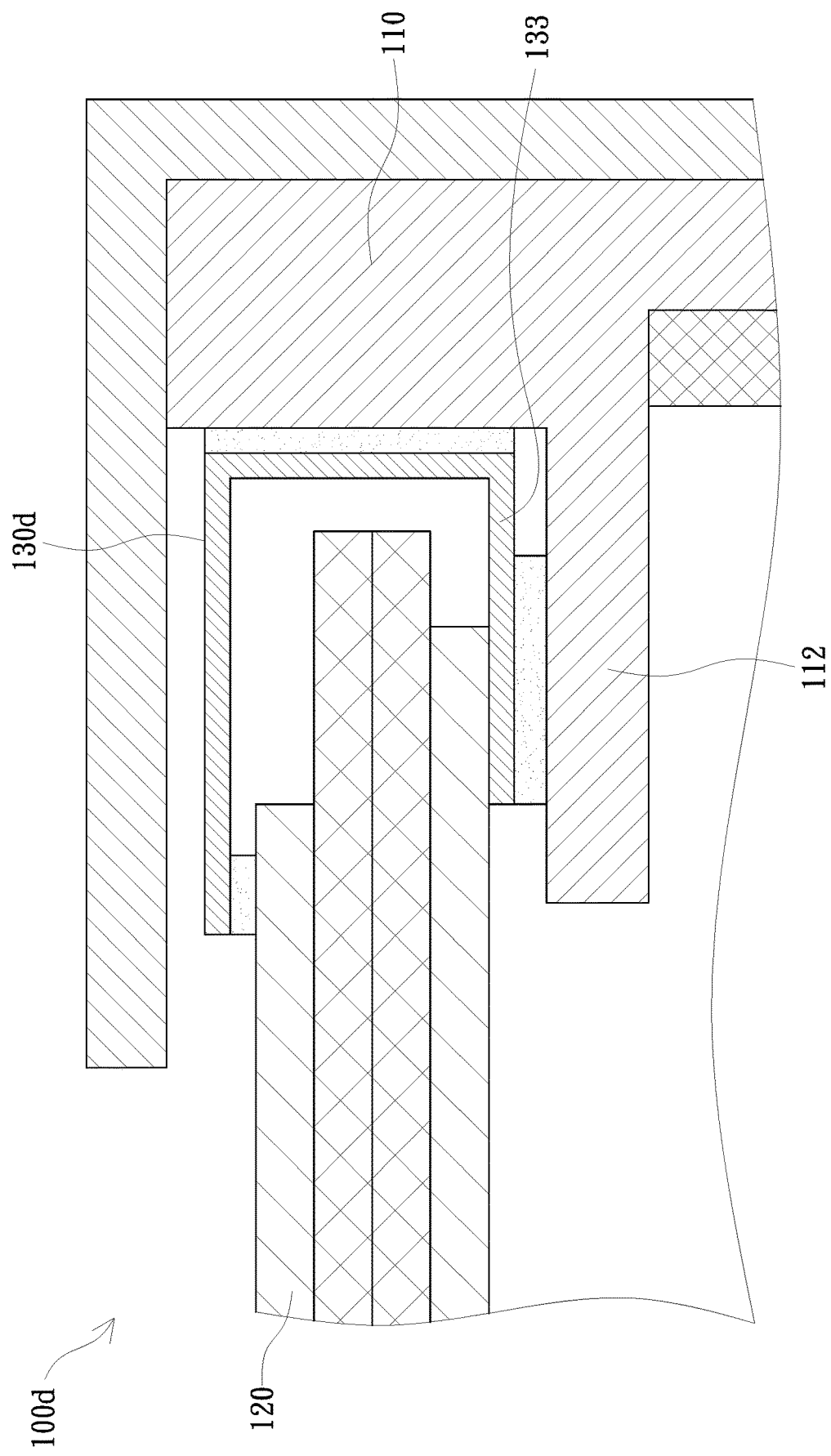
FIG. 8 is a partial schematic cross-sectional view of a display device according to another embodiment of the present invention.

FIG. 7 is a partial schematic cross-sectional view of a display device according to another embodiment of the present invention. FIG. 8 is a partial schematic cross-sectional view of a display device according to another embodiment of the present invention. The structure and the advantages of the display device 100$c$ in this embodiment are similar to those in the embodiment in FIG. 1, and the following describes only the difference. Referring to FIG. 7 firstly, the flexible sealing strip 130$c$ further has, for example, a third segment 133. The second segment 132 is connected to the first segment 131 and the third segment 133, and the third segment 133 extends between the base portion 112 and the display element 120. The display element 120 is disposed on the third segment 133, and is adapted to be moved with respect to the third segment 133. Specifically, the third segment 133 can further improve the tightness between the display element 120 and the middle frame 110. In addition, the display element 120 may be disposed on the third segment 133, and is not fixed to the third segment 133, to prevent the light leakage caused by the display element 120 being limited by the third segment 133 when warped due to heat. The third segment 133 may extend between the support member 140 and the display element 120 in this embodiment, and the third segment 133 is, for example, fixed to the support member 140, but the present invention is not limited thereto. For example, referring to FIG. 8, the support member 140 in FIG. 7 may be omitted in the display device 100$d$, and the third segment 133 of the flexible sealing strip 130 may be fixed to the base portion 112 of the middle frame 110. Similarly, the display element 120 may be placed on the third segment 133 and not fixed to the third segment 133.

In summary, the display device of the present invention uses the flexible sealing strip to seal the space between the display element and the middle frame, wherein the first segment of the flexible sealing strip is fixed to the display element, and the second segment is fixed to the middle frame. The second height by which the second segment is distanced from the base portion is larger than or equal to the first height by which the first segment is distanced from the base portion, so that the first segment is maintained in a loose state before squeezed by the display element. Therefore, when the display element starts to deform and push the flexible sealing strip, the first segment can receive the external force applied by the display element, and shows a larger deformation magnitude than the display element as the external force increases, so as to immediately absorb the pushing force of the display element in real time, such that the display element has a deformation allowance when warping. Based on the foregoing description, the display device of the present invention can not only provide the dust-proof function, but also provide an enough allowance for the display element to deform, thereby improving the optical grade.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
   a middle frame, having a top portion, a base portion, an inner side surface, and an outer side surface, the inner side surface being opposite to the outer side surface, the top portion being opposite to the base portion, the top portion being located between the inner side surface and the outer side surface, and the base portion being connected to the inner side surface;
   a display element, disposed on the base portion; and
   a flexible sealing strip, sealed between the display element and the inner side surface, the flexible sealing strip having a first segment and a second segment connected to the first segment, the first segment being bent with respect to the second segment, and the first segment having a first end and a fixed region, the first end being opposite to a connection side of the first segment connected to the second segment, the fixed region being located between the first end and the connection side, the fixed region being fixed to the display element, the second segment being fixed to the inner side surface, the second segment having a top end and a bottom end opposite to the top end, the bottom end being close to the base portion, and the top end being close to the top portion and being connected to the connection side of the first segment, wherein a first height is between the top end and the base portion, a second height is between the fixed region and the base portion, and the first height is larger than or equal to the second height;

wherein the connection side is connected to the inner side surface of the middle frame;

wherein the flexible sealing strip further has a third segment, the second segment is connected to the first segment and the third segment, the third segment extends between the base portion and the display element, and the display element is disposed on the third segment, and the display element is adapted to be moved with respect to the third segment.

2. The display device according to claim 1, wherein the display element comprises a plurality of optical films, the middle frame further has an opening and an accommodating space, the inner side surface and the base portion surround the accommodating space, the opening penetrates through the top portion and communicates with the accommodating space, the optical films are stacked in the accommodating space, one of the optical films closest to the opening is a top optical film, the first segment further has a non-adhesive region, the non-adhesive region is located between the fixed region and the connection side, the top optical film has a surface facing toward the opening, the fixed region is fixed to the surface, and the non-adhesive region extends onto the surface.

3. The display device according to claim 2, further comprising an adhesive layer, wherein the adhesive layer is disposed in the fixed region, the adhesive layer does not extend to the non-adhesive region, the fixed region is connected to the surface via the adhesive layer, the top optical film further has a side surface connected to the surface, the side surface faces toward the second segment, an orthographic projection of the first end on the surface is a boundary, and the surface has a first width between the boundary and the side surface; and the adhesive layer has a first side and a second side, the first side is opposite to the second side, and the second side faces toward the second segment, a second width is between the first side and the second side, and the second width is smaller than or equal to the first width.

4. The display device according to claim 3, wherein the first side does not extend to the first end or is flush with the first end.

5. The display device according to claim 1, further comprising a front frame, wherein the front frame is disposed at the top portion, the front frame shields the flexible sealing strip from the top portion, and the first segment is opposite to the front frame and apart from the front frame.

6. The display device according to claim 5, wherein the front frame overlaps with the first end.

7. The display device according to claim 1, wherein the third segment is fixed to the base portion.

8. The display device according to claim 1, further comprising a support member, wherein the support member is located between the base portion and the display element, the third segment extends between the support member and the display element, and the third segment is fixed to the support member.

9. The display device according to claim 1, wherein the inner side surface has a first corner, a first surface, and a second surface, the first corner is connected to the first surface and the second surface, the display element has a second corner corresponding to the first corner, the flexible sealing strip comprises a first part and a second part, the first part is sealed between the display element and the first surface, the second part is sealed between the display element and the second surface, the first part and the second part extend to the first corner and the second corner, and the first part and the second part are overlapped with each other at the first corner and the second corner.

* * * * *